United States Patent
Dalaa (10) Patent No.: US 9,983,835 B2
(45) Date of Patent: *May 29, 2018

(54) METHOD, PERFORMED BY A SERVER INTERPOSED BETWEEN A USER DEVICE AND AN AUTHENTICATED PRINTING SYSTEM, OF HANDLING A GUEST PRINT JOB FOR PROCESSING BY THE AUTHENTICATED PRINTING SYSTEM AND SYSTEM FOR PERFORMING THE METHOD

(71) Applicant: NEXT PRINT TECHNOLOGIES APS, Nærum (DK)

(72) Inventor: Tavs Dalaa, Frederiksberg C (DK)

(73) Assignee: NEXT PRINT TECHNOLOGIES APS, Naerum (DK)

( * ) Notice: Subject to any disclaimer, the term of this patent is extended or adjusted under 35 U.S.C. 154(b) by 40 days.

This patent is subject to a terminal disclaimer.

(21) Appl. No.: 15/031,586

(22) PCT Filed: Oct. 25, 2013

(86) PCT No.: PCT/IB2013/059673
§ 371 (c)(1),
(2) Date: Apr. 22, 2016

(87) PCT Pub. No.: WO2015/059525
PCT Pub. Date: Apr. 30, 2015

(65) Prior Publication Data
US 2016/0259602 A1 Sep. 8, 2016

(51) Int. Cl.
*G06F 3/12* (2006.01)
*G06F 21/60* (2013.01)
(Continued)

(52) U.S. Cl.
CPC .......... *G06F 3/1222* (2013.01); *G06F 3/1204* (2013.01); *G06F 3/1205* (2013.01);
(Continued)

(58) Field of Classification Search
CPC ....... G06F 21/608; G06F 3/1296; G06F 21/31
See application file for complete search history.

(56) References Cited

U.S. PATENT DOCUMENTS

2002/0114013 A1* 8/2002 Hyakutake ............ G06T 1/0021
358/3.28
2004/0230572 A1* 11/2004 Omoigui ........... G06F 17/30528
(Continued)

*Primary Examiner* — Ming Hon
(74) *Attorney, Agent, or Firm* — Birch, Stewart, Kolasch & Birch, LLP (57) ABSTRACT

Due to the lack of a user account, it is a problem to handle a guest print job, submitted by a guest user and associated with first user credentials, for processing by an authenticated printing system requiring the guest print job to be authenticated using second user credentials. This problem is solved by a method comprising the steps of i. obtaining the guest print job, the guest print job comprising print job metadata, the first user credentials being associated with the print job, ii. obtaining the second user credentials, iii. creating a guest user account with the authenticated printing system, the guest user account being associated with the second user credentials, iv. adding the second user credentials to the metadata, and v. forwarding at least the print job metadata, comprising the second user credentials, to the authenticated printing system for processing. A system and a computer program product for performing the method are also provided.

18 Claims, 1 Drawing Sheet

(51) Int. Cl.
*H04N 1/32* (2006.01)
*H04L 29/06* (2006.01)

(52) U.S. Cl.
CPC .......... *G06F 3/1238* (2013.01); *G06F 3/1247* (2013.01); *G06F 3/1285* (2013.01); *G06F 21/608* (2013.01); *H04N 1/32101* (2013.01); *G06F 3/1267* (2013.01); *H04L 63/08* (2013.01); *H04N 2201/0094* (2013.01)

(56) References Cited

U.S. PATENT DOCUMENTS

| | | | |
|---|---|---|---|
| 2006/0001897 A1 | 1/2006 | Ogasawara | |
| 2006/0026232 A1* | 2/2006 | Malik | G06Q 10/107 709/204 |
| 2006/0274355 A1* | 12/2006 | Ferlitsch | G06F 21/608 358/1.15 |
| 2007/0299921 A1* | 12/2007 | Brown | G06Q 10/107 709/206 |
| 2009/0009802 A1* | 1/2009 | Shaw | G06F 21/608 358/1.15 |
| 2010/0083133 A1* | 4/2010 | Takayama | G06Q 10/107 715/752 |
| 2010/0302579 A1* | 12/2010 | Nuggehalli | G06F 3/1203 358/1.15 |
| 2010/0309510 A1* | 12/2010 | Hansen | G06F 3/1203 358/1.15 |
| 2011/0145351 A1* | 6/2011 | Lee | G06F 3/1206 709/206 |
| 2011/0218892 A1 | 9/2011 | Jeong et al. | |
| 2013/0007450 A1* | 1/2013 | Janyavula | H04L 63/10 713/168 |
| 2013/0070288 A1* | 3/2013 | Muranaka | G06F 3/1204 358/1.15 |
| 2013/0222827 A1* | 8/2013 | Watanabe | G06F 3/122 358/1.13 |
| 2013/0235418 A1* | 9/2013 | Tanaka | H04N 1/00228 358/1.15 |
| 2013/0242334 A1* | 9/2013 | Ichida | G06F 3/1222 358/1.14 |
| 2014/0320883 A1* | 10/2014 | Ichida | G07F 17/26 358/1.14 |
| 2015/0339082 A1* | 11/2015 | Yeung | G06F 3/126 358/1.15 |

\* cited by examiner

METHOD, PERFORMED BY A SERVER INTERPOSED BETWEEN A USER DEVICE AND AN AUTHENTICATED PRINTING SYSTEM, OF HANDLING A GUEST PRINT JOB FOR PROCESSING BY THE AUTHENTICATED PRINTING SYSTEM AND SYSTEM FOR PERFORMING THE METHOD

TECHNICAL FIELD

The present invention concerns a method of handling a guest print job for processing by an authenticated printing system and system for performing the method. More particularly the present invention concerns a method of handling a guest print job, submitted by a guest user and being associated with first user credentials, for processing by an authenticated printing system requiring the guest print job to be authenticated using second user credentials.

BACKGROUND ART

Generally printers used by higher education institutions and corporate organizations are connected to an internal or local network so that the printers may be shared between the users. i.e. the students and staff or workers.

In order to control access as well as to control or limit the costs associated with printing, document management or print accounting systems, collectively referred to as authenticated printing systems, are used for tracking and accounting for printing activity. Print activity tracking and accounting is typically based on a user's network username. For this to work each print job should comprise the user's network username in the print job details. Accordingly when a user prints a document from his personal computer, PC, the print job generated from the document that the user wishes to print has the user's network username in the job details or print job metadata, e.g. in the header of the print job file, for use by the authenticated printing systems. When the user prints from a conventional PC the network user name is readily available for incorporation in the print job details as the user typically logs on onto the PC, and onto the local network to which the PC is connected, using the network user name.

Such a system works well with users who are already associated with the authenticated printing systems, i.e. users who already have user accounts with their user names and user credentials stored or registered in the authenticated printing system. Such users are typically students or staff, at a higher education institution, or workers in a corporate organization, i.e. users who are to have continuous access to the authenticated printing system.

Guests to a higher education institution or a corporate organization may however also require printing facilities. Guests may for example include visiting scientists or lecturers, customers, clients, or other temporary users and in many cases the higher education institution or corporate organization may want to provide guests with access to the authenticated printing system. Furthermore, guest printing may also be provided by for example a hotel to its guests.

Techniques for handling guest print jobs for providing printing facilities to guests or other temporary users are known from inter alia U.S. Pat. No. 7,551,319B2, U.S. Pat. No. 8,185,948B2 and U.S. Pat. No. 7,315,834B2.

DISCLOSURE OF INVENTION

Providing access to the authenticated printing system for a guest is however not without effort and/or difficulties as it requires setting up an account for the guest in the authenticated printing system. This is however problematic as the guest, visiting the higher education institution or corporate organization, typically will only be staying a limited time such that the spending of time on setting up accounts or finding and interacting with the administrator is undesired.

As the administrator is required to create an account for each guest user it becomes a problem if there are many guest users.

Further, in order to ensure that the guest print job submitted by the guest can be handled by the authenticated printing system, the administrator of the authenticated printing system may need access to the guest's user device, i.e. computer, tablet computer or Smartphone, for installing or configuring software for ensuring that the user credentials associated with the account for the guest are included with the guest print job. Access to the guest user's device is also needed where the guest's user device is not equipped with the printer drives or other software needed for generating the print job.

Gaining such access may however in some cases be impossible or problematic as the guest may not wish to allow the administrator to access the user device.

In some cases it may not be possible to install or configure software on the guest's user device due to the limited computational resources of common guest user devices such as Smartphones and tablet PCs.

It is therefore an object of the present invention to simplify and/or improve printing by guest users on authenticated printing systems.

Accordingly it is an object of the present invention to provide a method of handling a guest print job for processing by an authenticated printing system which does not require an administrator of the authenticated printing system to manually set up a guest account with the authenticated printing system for the guest.

It is a further object of the present invention to provide a method of handling a guest print job for processing by an authenticated printing system which does not require the guest to have a guest account with the authenticated printing system prior to submitting the guest print job.

It is a further object of the present invention to provide a method of handling a guest print job for processing by an authenticated printing system which does not require the guest's user device to be modified or configured to include any specific type of user credentials, in particular not any user credentials used by the authenticated printing system, with the guest print job as it is submitted.

It is a further object of the present invention to provide a method of handling a guest print job for processing by an authenticated printing system which allows the authenticated printing system to perform authentication, tracking, accounting and/or secure printing.

It is also an object of the present invention to provide a system for performing the method for achieving at least one of the above mentioned objects.

It is additionally an object of the present invention to provide software configured for causing a computer on which the software runs to perform the method for achieving at least one of the above mentioned objects.

At least one of the above objects, or at least one of the further objects which will be evident from the below description, is according to a first aspect of the present invention achieved by the method according to claim 1.

By obtaining the second user credentials, creating the guest user account and adding the second user credentials to the guest print job the guest print job, as seen from point of view of the authenticated printing system comprises the required second user credentials, and as there now exists a guest user account corresponding to the second user credentials the guest print job may now be processed.

The authenticated printing system may thus perform authorization of the user, secure printing of the print job, tracking of the print job, and/or accounting of the print job as if the print job originated from a user already having a user account with the authenticated printing system.

Further as the guest user account is created after the guest user has submitted the guest print job the guest user is not required to have the guest user account with the authenticated printing system prior to submitting the guest print job As the first user credentials are not used by the authenticated printing systems the first user credentials may be any information identifying the guest user, thus the guest user device does not need to be set up to include any specific type of user credentials, in particular any user credentials used by the authenticated printing system, with the guest print job. This also allows the guest user to use different types of user devices provided that the guest print job may be obtained from them.

As seen from the above the method according to the first aspect of the present invention simplifies and/or improves printing by guest users on authenticated printing systems.

The steps are preferably performed from step i to v.

The steps of the method may be performed by a processing server.

Handling comprises printing, attempting to print and/or storing for later printing.

The guest print job is a print job submitted by a guest user. The term print job is therefore, as long as it clear from the context that the print job is associated with the guest user, interchangeable with the term guest print job.

The guest print job comprises a file such as a for example a document in Microsoft® word or Excel® format, a PDF document, an image in for example JPEG format, etc. The print job may also be a file directly readable by a printer by being in PDL (Page Description Language). PS (Postscript) or PCL (Printer Command Language) language. Thus guest print job is to be understood as encompassing any file, whether directly readable by a printer or not, that the guest user desires to print.

The guest print job may be submitted as an attached file in an email, as the contents of an email, by web upload to a web site hosted by the processing server, via a cloud printing service, by connecting to a cloud storage system through the processing server and selecting a document for the processing server to download and print.

The guest user may be a temporary user in a higher education institution or corporate organization such as a visiting scientist or lecturer, a customer, a client, a visiting or temporarily relocated staff member or worker etc.

The guest user may use a guest user device such as a Smartphone, tablet PC, conventional PC, thin client PC or packaged laptop such as a Chromebook™ for submitting the guest print job The first user credentials is any information identifying the guest user. The first user credentials may comprise an email address from which the guest print job is received, a username, author name, telephone number or other personal information found in the document properties of a document such as a Microsoft® Word document that is submitted to the processing server by web upload, an IP address from which the guest user has sent the above mentioned email or submitted the above mentioned document, or a code or username selected by the guest user.

The authenticated printing system typically comprises an authentication, tracking and accounting server such as a server running Pcounter, Equitrac, Papercut, or other print tracking and accounting software.

The processing server may further be connectable to an external authentication server such as an ActiveDirectory or LDAP server.

The second user credentials may comprise a network user name, an email address, a telephone number, an IP address or a code unique to the user. The second user credentials may further comprise a password associated with the email address, the network username, the telephone number, the IP address or the code to prevent unauthorized access to the authenticated printing system.

Preferably the second user credentials is a username or a code that is smaller, i.e. contains less information or less digits and letters than the first user credentials. Most preferably therefore the second user credentials then comprises a 4 digit PIN code such as "2234" or an abbreviated name such a "ASC" standing for a guest user having a first user credentials comprising the email address Adam.Smith@customer.com.

The second user credentials are used for authenticating the user to the authenticated printing service in order to identify the user to the authenticated printing service so that the authenticated printing service may process the print job.

The first user credentials may be associated with the guest print job by being for example the email address or IP address from which the guest print job is received, by being included in contents of the guest print job such as being included in the name of the document or the file name of the document to be printed, or by being included in the document metadata of the document to be printed. The document metadata may for example comprise data fields stating the author of the document, or the owner of the document, the creator of the document.

Further the first user credentials may be associated with the guest print job by being included in the contents, such as text in a text document, of the document to be printed.

Furthermore it is contemplated within the context of the present invention that the guest print job metadata may comprise the first user credentials.

The guest print job may be obtained by for example receiving or retrieving an email comprising the guest print job, typically as an attachment to the email, receiving the guest print job as the guest print job is uploaded, by the guest user, to a web site hosted by the processing server, retrieving the guest print job from a cloud storage system using user credentials supplied by the guest user on a web site hosted by the processing server, or receiving or retrieving the guest print job from a cloud printing service.

In the context of the present invention guest print job metadata is to be understood as encompassing print job details. The metadata may comprise the name or other identification information, including a network address, of the printer on which the print job is to be printed. In a guest print job the print job metadata may refer to the part of the file written in PJL (Printer Job Language) language, comprising for example the field Username which may comprise the second user credentials, while the print job itself is the part of the file written in PDL (Page Description Language), PS (Postscript) or PCL (Printer Command Language) language.

Where the guest print job is a document such as a PDF file, the print job metadata comprises the author or owner of the PDF file or similar attribute in PDF document metadata.

Further, the guest print job metadata may comprise the name of the document to be printed.

The second user credentials may be obtained by randomly generating the second user credentials. Alternatively a function operating on the first user credentials generates the second user credentials. For example, if the first user credentials comprise an email address such as user@company.com, the second user credentials may be generated by a truncation or other function operating on the first user credentials by returning only the letters prior to the @ sign, i.e. returning only "user".

It is further contemplated within the context of the present invention that the second user credentials may be obtained by copying the first user credentials so that the second user credentials are the same as the first user credentials.

Creating the guest user account may comprise setting rules and/or settings for the guest user account for limiting the printing done by the guest user. The guest user account may be temporary, i.e. deleted after a certain time, or alternatively the guest user account may be permanent. Thus the method may comprise the step of deleting the guest user account from the authenticated printing system after a certain time has passed since the creation of the guest user account.

The guest user account is associated with the second user credentials such that the guest user may be authenticated, using the second user credentials, for using the guest user account and the authenticated printing system.

In the event that the guest print job metadata comprises the first user credentials, then adding the second user credentials to the metadata is to be understood as encompassing any of substituting the first user credentials with the second user credentials in the metadata, and, adding the second user credentials to a field of the metadata different from the field comprising the first user credentials.

The print job metadata may comprise both the first and second user credentials as long as the second user credential are present in the field of the metadata in which the authenticated printing system expects to find the owner, i.e. the user, associated with the document and the print job.

However, typically the first user credentials are not comprised by the guest print job metadata, instead being only associated with the guest print job as described above. In this case the second user credentials are simply added to the guest print job metadata. If for example the guest print job comprises a pdf-document received by an email the second user credentials may for example be added to the file name of the pdf-file.

In the context of the present invention forwarding at least the print job metadata comprising the second user credentials, to the authenticated printing system for said processing is to be understood as encompassing forwarding the print job, comprising the print job metadata comprising the second user credentials, to the authenticated printing system for the processing.

Generally it may be sufficient to forward only the metadata to the authenticated printing system for the processing, but preferably the print job, including the metadata is forwarded to the authenticated printing system for the processing.

The embodiments according to claim 2 define different ways of processing the print job by the authenticated printing system.

Authenticating may comprise comparing said second user credentials to a list of second user credentials associated with users allowed to print using the authenticated printing system.

Tracking may comprise listing the print job in a log.

Accounting the print job may comprise debiting the account associated with the user, by for example subtracting the number of pages of the print job from a quota of printable pages, or subtracting the cost of printing the print job from a balance. Accounting the print job may alternatively, or additionally, comprise store information about the print job for later presentation to the user.

Forwarding the print job may comprise forwarding the print job to a printer comprised by the authenticated printing system, or alternatively forwarding the print job to a printer connected to the authenticated printing system. In either case the forwarding may be via a print server being part of the authenticated printing system, or alternatively being separate from the authenticated printing system.

The printer may be a laser printer or ink jet printer, a multifunctional printer (MFP), or a reprographic machine.

Claim 3 defines a preferred embodiment of the method according to the present invention. Converting the print job for making it printable by a printer may comprise using the software application corresponding to the file format of the document to open or read the document, followed by using a printer driver corresponding to the printer on which the document is to be printed to convert the document into a print job written in a suitable printer language such as PS (PostScript), PCL (Printer Command Language) or similar.

Preferably the obtaining of the print job also comprises rendering the print job, such as into a bitmap.

Claim 4 defines a preferred embodiment of the method according to the present invention. The transforming is preferably configured to reduce the information content of the first user credentials. Preferably the transformation comprises a truncation of the first user credentials. Alternatively the transformation may comprise abbreviating the first user credentials.

Claim 5 defines an alternative embodiment of the present invention. This provides the opportunity for the guest user to choose the second user credentials. The second user credentials may be obtained by receiving or retrieving an email from the guest user or by receiving the second user credentials on a web site hosted by the processing server.

Claim 6 defines a preferred embodiment of the method according to the present invention. If the first user credentials comprise an email address associated with the guest user it becomes very easy to contact the guest user by sending an email to the email address. The obtaining of the second user credentials from the guest user may comprise receiving an email from the user comprising the second user credentials, or directing the guest user to a website for receiving the second user credentials.

In the context of the present invention an email address associated with the guest user is to be understood as encompassing an email address accessible and useable by the guest user for at least receiving email.

Claim 7 defines a preferred embodiment of the method according to the present invention. If the second user credentials are to be obtained from the guest user it is preferred that the second user credentials are stored in the user credentials mapping database mapped to the first user credentials so that the next time the guest user wishes to print a document using the authenticated printing system the second user credentials will be present in the user credentials mapping database so that there is no need to obtain the second user credentials from the guest user this time.

In the context of the present invention the user credentials mapping database is to be understood as encompassing a relational database or other database type storage. The user credentials mapping database may be one or more tables in a SQL database. Retrieving the second user credentials from the user credentials mapping database may comprise using the first user credentials in a SQL SELECT statement to retrieve the second user credentials related to the first user credentials.

Claim 8 defines one embodiment of the method according to the present invention. This is advantageous as it increases security for the guest user as it ensures that the guest print job is only printed when desired by the guest user. Further it limits abuse of printing by the guest user as the guest user has to submit the release code for printing to be carried out. The holding queue may be located in the authenticated printing system or in the processing server.

The steps are preferably performed in the order of xi, xii, xiii.

The release code may be an alphanumerical string, network username, or the second user credentials, etc. The release code may be generated by the authenticated printing system or it may be generated by the processing server.

Providing the release code to the guest user may comprise sending the release code in an email or, in a SMS or MMS, by direct messaging such as, or by publishing the release code on a website reachable by a unique URL sent to the user or in an application or user inter face on the guest user device.

Preferably providing the release code comprises inputting the release code on a printer or on a computer located near a printer. Preferably the print job is then printed on that printer. Providing the release code to the guest user or receiving the release code from the guest user may further comprise providing a list of available printers in or connected to the authenticated printing system and receiving a selection of one of the printers to print the guest print job from the guest user.

Further, where the guest user uses a web site hosted by the processing server to upload the guest print job, the release code may be displayed on that web site after the upload has been completed and the release code has been generated.

Receiving the release code may comprise receiving the release code in an email, SMS or MMS, or receiving the release code on a website hosted by the authenticated printing system or the processing server. The website may be displayed on a display of the printer or on a computer in the vicinity of the printer.

Releasing the guest print job from the holding queue may comprise forwarding the guest print job, comprising the print job metadata comprising the second user credentials, to the authenticated printing system for the processing.

Claim 9 defines a preferred embodiment of the method according to the present invention. Preferably the first user credentials comprise an email address associated with the guest user as this readily provides for communicating the release code to the guest user.

Claim 10 defines a preferred embodiment of the method according to the present invention. The first network is preferably a local network such as an office network, possibly including a virtual private network, VPN, of a corporate organization or campus wide network of a higher education institute such as a University.

At least one of the above objects, or at least one of any of the further objects which will be evident from the below description, are according to a second aspect of the present invention achieved by the system according to claim 11.

The system according to the second aspect of the present invention is for performing the method according to the first aspect of the present invention, thus the above described embodiments of features of the method according to the first aspect of the present invention are applicable to the system according to the second aspect of the present invention.

Further embodiments of the system according to the second aspect of the present invention, and further embodiments of features of the system according to the second aspect of the present invention, are given below.

As the guest management program routine obtains the second user credentials and causes the creation of the guest user account the system does not require an administrator of the authenticated printing system to manually set up the guest account.

Further as the metadata modification program routine adds the second user credentials to the guest print job metadata the guest print job, as seen from point of view of the authenticated printing system comprises the required second user credentials, and as there now exists a guest user account corresponding to the second user credentials the guest print job may now be processed.

The processing server may be a separate server or may be integrated as a part of other software. In particular the program routines of the processing server may be integrated with the commercially available mobile print software solution EveryonePrint, currently in version 3.3, developed by Next Print Solutions. The program routines of the processing server, and accordingly the processing server, may thus form part of the EveryonePrint software and run as part or the EveryonePrint software on a server.

In the context of the present invention connectable is to be understood as encompassing connected or connectable for forwarding at least part of the guest print job to the authenticated printing system for the processing.

In the context of the present invention program routine is to be understood as encompassing program module. Further the program routine may comprise software or hardware. More than one of the program routines may be combined in a single software.

Further more than one server may run in separate virtual servers on a single physical server. In other words an LDAP server and the authentication tracking and accounting server may run on separate virtual servers running on a single physical server.

Furthermore the functions of different servers may be combined in a single server such that a single server may perform both authentication and tracking and accounting.

The print job obtaining program routine may comprise program routines for receiving or retrieving an email comprising the guest print job, program routines for receiving or retrieving the guest print job from a cloud printing solution or a cloud storage system, program routines for receiving the guest print job from a web upload to a web site hosted by the processing server or the print job obtaining routine. The print job obtaining program routine preferably further comprises program routines for extracting the guest print job from the email if the guest print job is sent as an attachment to the email.

The guest management program routine may comprise program routines for obtaining the second user credentials, including program routines for generating the second user credentials. The guest management program routine preferably further comprises program routines for managing and interacting with the authenticated printing system for causing the authenticated printing system to create the guest user account.

Program routines for managing and interacting with the authenticated printing system may comprise an API interface or gateway utility or module, or an integration API between the processing server and the authenticated printing system. The API could be a DLL based API, Web services API, Rest API etc.

Alternatively, where the authenticated printing system uses a database, such as an SQL database the program routines for managing and interacting with the authenticated printing system may comprise program routines for directly querying and modifying the database.

The program routines for managing and interacting with the authenticated printing system may comprise program routines for creating a guest user account with the authenticated printing system, setting permissions, quotas, setting rules etc. For the guest user account, deleting the guest user account, verifying if a second user credentials are associated with a guest user account.

Authenticated printing systems having program routines for managing and interacting with the authenticated printing system are known in the art.

The metadata modification program routine may be configured to retrieve or receive the second user credentials from the guest management program routine for adding the second user credentials to the guest print job metadata.

The processing server may be configured to forward at least the guest print job metadata to the authenticated printing system by comprising program routines for sending at least the guest print job metadata to the authenticated printing system.

A preferred embodiment of the system according to the second aspect of the present invention is defined by claim 12.

One or more of the authentication, print job tracking, accounting and print-server may be combined in a single server or software.

The print server may be a part of the authenticated printing system but may also be separate from the authenticated printing system but connected to the authenticated printing system.

The system may comprise the authenticated printing system.

A preferred embodiment of the system according to the second aspect of the present invention is defined by claim 13. The conversion program routine and the rendering program routine may be combined in a single program routine.

A preferred embodiment of the system according to the second aspect of the present invention is defined by claim 14. By storing the first and second user credentials they are readily available the next time the guest user submits a guest print job, thus there is no need for obtaining a new second user credentials the next time the guest user submits a guest print job to the processing server.

One embodiment of the system according to the second aspect of the present invention is defined in claim 15. This is advantageous as it provides for secure printing. As an alternative the authenticated printing system may be configured for holding the guest print job in a holding queue pending receipt of a release code, for providing the release code to the guest user, and for releasing the guest print job from the holding queue upon receiving the release code from the guest user.

A preferred embodiment of the system according to the second aspect of the present invention is defined by claim 16.

This is advantageous as there is no need to create a new release code since the second user credentials are used instead. In this case the second user credentials are preferably small, such as a 4-digit PIN-code or similar.

The second user credentials are preferably provided to the guest user via email. This works best if the first user credentials is an email address. Alternatively, where the guest user submits his guest print job via web upload to a web site hosted by the processing server, the second user credentials may be provided to the guest user by being displayed on that web site.

A preferred embodiment of the system according to the second aspect of the present invention is defined by claim 17. This is advantageous as it allows users already having a user account with the authenticated printing system, and guest users not having a guest user account with the authenticated printing system, to submit print jobs to the same processing server.

The authentication server may be an ActiveDirectory or LDAP server.

In the context of the present invention determining if the guest user account exists is to be understood as encompassing determining if the first user credentials exist in the authentication server.

The authentication program routine may additionally be configured to authenticate the guest user against the authenticated printing system using the first user credentials, and/or using the second user credentials In this case the authentication program routine preferably comprises program routines for managing and interacting with the authenticated printing system, as described above, for authenticating the guest user.

The authentication program routine and/or the processing server are preferably configured for forwarding the print job to the metadata modification program routine if it determines that the guest user account exists.

At least one of the above objects, or at least one of any of the further objects which will be evident from the below description, are according to a third aspect of the present invention achieved by a computer program product according to claim 18.

The computer program product according to the third aspect of the present invention, when executed on a computer, causes the computer to perform the steps of the method according to the first aspect of the present invention.

The computer program according to the third aspect of the present invention may thus be used to provide the processing server of the system according to the second aspect of the present invention.

A computer usable medium may comprise a floppy disk, tape, a removable hard disk, a rewritable or non-rewritable CD or DVD, etc.

In the context of the present invention a computer program product directly loadable into the memory of a computer is to be understood as encompassing a computer program product stored as a compressed or non-compressed file on a file server or computer or a computer program product loaded into the physical or virtual working memory, e.g. RAM, cache, or registry, of a computer. Thus a computer program product downloadable from a server is considered to be encompassed by a computer program product directly loadable into the memory of a computer.

BRIEF DESCRIPTION OF THE DRAWING

The invention and its many advantages will be described in more detail below with reference to the accompanying schematic drawing, which for the purpose of illustration shows some non-limiting embodiments, and in which.

DESCRIPTION OF EMBODIMENTS

In the below description, one or more signs added to a reference number indicates that the element referred to has the same or similar function as the element designated the un-superscripted reference number, however, differing in structure.

Further, where useful for discussing a plurality of identical elements, one or more subscript Latin numerals added to a reference number indicates that the element referred to is a further one of the element designated the un-subscripted reference number.

When further embodiments of the invention are shown in the figures, the elements which are new in relation to earlier shown embodiments have new reference numbers, while elements previously shown are referenced as stated above. Elements which are identical in the different embodiments have been given the same reference numerals and no further explanations of these elements will be given.

Figure 1:
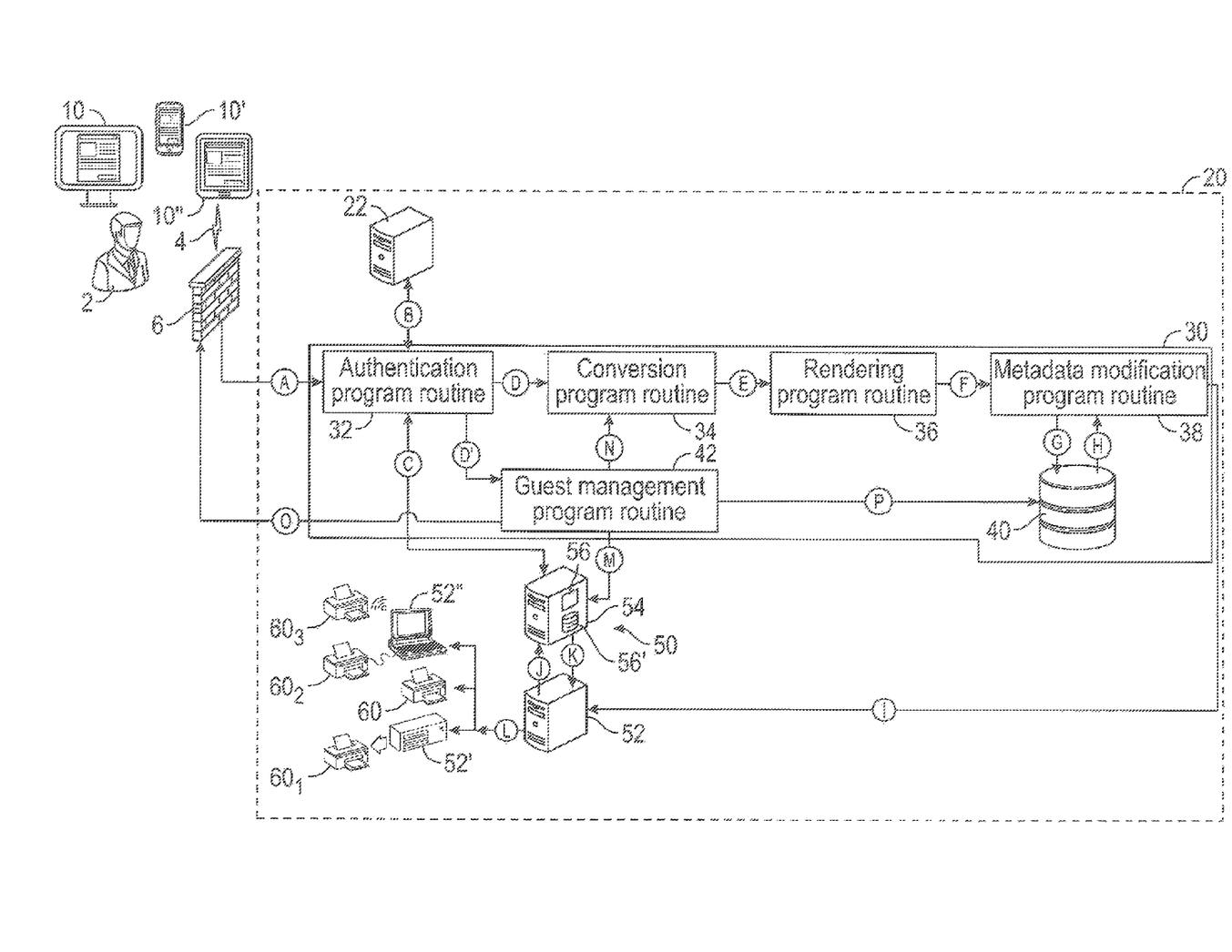
FIG. 1 shows a first embodiment of a method of handling a guest print job for processing by an authenticated printing system and a system for performing the method according to the first and second aspects of the present invention.

FIG. 1 shows a first embodiment of a method of handling a guest print job for processing by an authenticated printing system and a system for performing the method according to the first and second aspects of the present invention. A user 2 wishing to print a document may use any of a desktop PC 10, a Smartphone 10' or a tablet PC 10", each representing a user device, to submit a print job via a wireless network 4 and through a firewall 6 for printing on a printer located on a local network 20 of a higher education institution such as "Acme University" or a corporate organization. Users of the local network 20 are authenticated for access to the local network 20 using an authentication server 22.

Within the local network 20 is further provided a processing server 30 for handling the print job as will be described below.

User 2 may submit his print job for example by attaching the document to be printed to an email retrievable by the processing server 30, by uploading the document using a web site interface hosted by the processing server 30 or on its behalf, by using a driver software on the user device 10, 10', 10", by submitting the document to a cloud printing service, or by providing a reference to a document stored in a cloud storage system.

In either way the document to be printed is supplied to the processing server 30 in step A The processing server 30 is interposed in the path of the document between user device 10, 10' or 10" and the authenticated printing system 50 of "Acme University" and the printer 60 operated by "Acme University".

The processing server 30 may comprise a user interface program routine (not shown) for hosting a website to which the user may navigate using any of the user devices 10, 10' or 10" for uploading the print job, i.e. the document to be printed. Alternatively the processing server may comprise an email program routine (not shown) for receiving or retrieving an email comprising the print job. The processing server 30 may comprise further program routines for receiving or retrieving the document to be printed.

The processing server 30 comprises an authentication program routine 32 for authenticating the user 2 using first user credentials, associated with the print job or supplied with the print job. The first user credentials may for example be the email address of the user 2 or the owner of the print job, or the IP address from which the email is sent. Authentication is performed based on the first user credentials against the authentication server 22 in step B.

Where second user credentials are supplied with the print job, for example when the print job was uploaded to a web site hosted by the processing server 30 and the second user credentials where submitted by the user 2 on that website, then the authentication program routine 32 may also authenticate the user 2 using the second user credentials against an authentication, tracking and accounting server 54, more details below, of an authenticated printing system 50, more details below, in step optional step C.

The second user credentials may be the user's username on the local network 20.

For authenticating the user 2 against the authentication, tracking and accounting server 54, a management program routine for managing the authentication, tracking and accounting server 54 is provided (not shown) in the processing server 30 or is made accessible to the processing server 30.

The management program routines for managing and interacting with the authenticated printing system 50 may comprise an API (Application Programming interface) 56 provided in the authentication, tracking and accounting server 54. Further alternatives include a gateway utility or module provided in the authentication, tracking and accounting server 54 or an integration API between the processing server 30 and the authenticated printing system 50. The API May be a DLL based API, Web services API, Rest API, etc.

Alternatively, if the authentication, tracking and accounting server 54 stores user accounts in a database such as SQL database 56', the management program routines for managing and interacting with the authenticated printing system 50 may comprise program routines for directly querying and modifying the SQL database 56'.

In a first, known user scenario the user 2 is known by the authentication server 22 on the basis of the first user credentials, or the authentication, tracking and accounting server 54 on the basis of the second user credentials. In this scenario the print job is then in step D forwarded to a conversion program routine 34.

The conversion program routine 34 converts the document using the software application corresponding to the format of the document 22 in a first step to read the document, and a printer driver for obtaining a print job based on the document 22 in a second step. The conversion program routine 34 may not be needed where the document is directly printable by a printer. The print job comprises metadata which may include the first user credentials for identifying the user 2 as the owner of the print job.

Alternatively the print job metadata does not comprise the first user credentials.

The print job is then sent to a rendering program routine 36 in step E in which it is rendered into a bitmap suitable for printing by a printer. The rendered print job is then in step F sent to a metadata modification program routine 38 in which the second user credentials are injected or added into the metadata, replacing or substituting the first user credentials if present in the metadata.

The second user credentials are obtained from a user credentials mapping database 40 by querying the user credentials mapping database 40 using the first user credentials for obtaining the second user credentials in steps G and H.

If there are no second user credentials corresponding to the first user credentials stored in the user credentials mapping database the metadata modification program routine 38, or the processing server 30 is configured to either a) discard the print job, b) where the first user credentials comprise the user 2's email address-contact the user 2 to prompt the user 2 to submit the second user credentials (not shown), or c) initiate the guest management program routine as discussed below.

The conversion program routine 34 and the metadata modification program routine 38 may be combined into a single program routine for obtaining a print job, comprising print job metadata comprising the second user credentials, in a single program routine.

The metadata modification program routine 38, after retrieving the second user credentials in step H, now injects or adds the second user credentials to the metadata of the print job, replacing or substituting the first user credentials if present in the metadata, and forwards the print job to the authenticated printing system 50 in step I. The authenticated printing system 50 comprises a print server 52, and the authentication, tracking and accounting server 54. The print job is first analyzed by the print server 52 to determine the destination, i.e. which printer is to print the print job. Additionally the print job metadata is supplied to the authentication, tracking and accounting server 54 in step J. The authentication, tracking and accounting server 54 comprises a database of a plurality of second user credentials, one of the plurality of second user credentials corresponding to the second user credentials comprised by the print job metadata for authenticating the user 2 as being allowed to use the printers connected to the authenticated printing system 50. Further the authentication, tracking and accounting server 54 may comprise an active print job database comprising details of every print job currently printing on the printers or temporarily stored by the print server 52 in order to track the progress of each print job. The authentication, tracking and accounting server 54 also comprises a database of user accounts, each user account being associated with one of the plurality of second user credentials, comprising settings or quotas for controlling and restricting printing on a per user basis. The settings may for example comprise settings or rules for limiting which printers are available to each user, including the user 2, and the quotas may comprise a maximum number of pages printable per user, including user 2, and month or year. Further the rules may include rules which disallow the user from printing any colour print jobs, only allowing the user to print in black/white.

After the authentication, tracking and accounting server 54 has determined that the user 2 is allowed to print the print job, e.g. by determining that the quota corresponding to the user 2 is not yet met and will not be exceeded by printing the print job, then the authentication, tracking and accounting server 54 communicates this to the print server 52 in step K, following which the print server 52 sends the print job to the printer 60 in step L for printing. The printer 60 then directly, or after temporarily storing the print job in the memory of printer 60, prints the print job.

The above describes the known user scenario where the user 2 already has a user account with the authentication tracking and accounting server 54, the user account being associated with the second user credentials. Further there exists a second user credential mapped to the user 2's first user credentials and stored in the user credentials mapping database 40.

Normally in the known user scenario a guest user does not have a user account with the authentication tracking and accounting server 54. As there is no user account there is no second user credentials associated with the user account. Further the first user credentials submitted with the print job are not known to the authentication server 22, thus a guest user cannot be authenticated in steps B and C against the authentication server 22 or the authentication tracking and accounting server 54. Further the authenticated printing system 50 would not be able to handle such a print job.

This problem is solved by the guest management program routine 42.

In the guest user scenario, where the processing server further includes the guest management program routine 42, if the user 2 cannot be authenticated against the authentication server 22 and the authentication tracking and accounting server 54, the print job is in modified step D' forwarded to the guest management program routine 42. The guest management program routine 42 now generates second user credentials for the user 2. The second user credentials may be temporary, i.e. destined to be revoked after a time such as for example 24 hours, or may be permanent. In the case the second user credentials are destined to be temporary the guest management program routine 42 stores the generated second user credentials in a database together with a time point when the second user credentials for the user 2 should be revoked.

The generated second user credentials are then used in step M to create a guest user account for the user 2 with the authentication tracking and accounting server 54 by instructing the API 56 to create the guest user account, or by creating the guest user account directly in the SQL database 56' using SQL commands.

The guest management program routine 42 may be configured to assign rules and quotas to the guest user account, by instructing the above mentioned API 56 or modifying the SQL database 56, to prevent excessive printing by the user 2 if the user 2 is a guest. The print job is then in step N forwarded, still with the first user credentials, to the conversion program routine 34 after which processing proceeds as described above. If desired the guest management program routine 42 may further be configured to instruct the conversion program routine to 34 to specify that the print job should be printed with secure release, i.e. held in a print queue or holding file in the processing server 30 or in the authentication, tracking and accounting server 54, until the proper release code is provided.

The guest management program routine 42 may in step O forward the generated second user credentials to the user 2 for example in an email. The second user credentials 2 may then be used by the user 2 when submitting further documents for printing, or the second user credentials may be used as a release code to release the print job if the print job was to be printed with secure release. In this case the user 2 may for example navigate to a website hosted by the processing server 30 or the authentication, tracking and accounting server 54 to release the print job for printing.

The guest management program routine 42 in step P forwards the first user credentials and the generated second user credentials to the user credentials mapping database 40 for storing and mapping the second user credentials to the first user credentials so that the second user credentials may be retrieved in step H by the metadata modification program routine 38.

In case the generated second user credentials are temporary, the guest management program routine may further, not shown, after a time has passed communicate with the authentication, tracking and accounting server 54 in order to delete the guest user account created in step M using the API 56 or directly deleting the guest user account in the SQL database 56'.

Thus, as can be seen in FIG. 1, the first embodiment of the method and system according to the first and second aspects of the present invention allows the user 2, even if he is a guest who does not from the outset have a user account with the authentication, tracking and accounting server 54, to print a document on the authenticated printing system 50 by providing the guest management program routine which generates second user credentials for the user 2 and uses the generated second user credentials to create a guest user account with the authentication, tracking and accounting server 54. There is further no need to manually create a user account for the user 2.

As the guest management program routine 42 further forwards the first user credentials and the generated second user credentials to the user credentials mapping database 40 there is no need for the user 2 to resubmit his print job.

Further the printing of the user 2, even if he is a guest, may be controlled and limited using all available functions of the authenticated printing system 50.

As an alternative to, or in addition to the guest management program routine 42 generating the second user credentials, the guest management program routine 42 and/or the processing server 30 may be configured such that when the print job in step D' arrives at the guest management program routine 42, the guest management program routine 42 and/or the processing server 30 hosts a web site for self registration where the user 2 may register his first user credentials and where the user 2 may choose the second user credentials. Where the first user credentials comprises an email address associated with the user 2, the user 2 may be directed to the web site for self registration using an email sent by or on behalf of the guest management program routine 42 or the processing server 30 to the email address.

The web site for self registration may additionally be visited by the user 2 prior to submitting his print job, in which case the user 2 in step B and C is able to be authenticated as in the known user scenario.

As an alternative to the printer 60 the print job may in step L be sent to the printer 60₁ via a secondary print server 52'. In a further alternative the print job is sent in step L to wired printer 60₂ or wireless printer 60₃, any of which may be connected to a secondary print server embodied by laptop computer 52" comprising wired and wireless interfaces for communication with the respective printers 60₂ and 60₃.

Although FIG. 1 shows the user 2 as being positioned outside the local network 20, i.e. outside the firewall 6, the user may alternatively be located within the local network 20 or the user 2 may connect to the local network 20 directly, i.e. not through the firewall 6.

List of parts with reference to the figures:

2. User
4. Wireless network
6. firewall
10. Local network
22. Authentication server
30. Processing server
32. Authentication program routine
34. Conversion program routine
36. Rendering program routine
38. Metadata modification program routine
40. User credentials mapping database
42. Guest management program routine
50. Authenticated printing system -continued List of parts with reference to the figures:

52. Print server
54. Authentication, tracking and accounting server
56. API
60. Printer

The invention claimed is:

1. A method of handling a guest print job, submitted by a guest user by means of a user device and comprising first usr credentials, for processing by an authenticated printing system for printing a document on a printer, the authenticated printing system requiring said guest print job to be authenticated using second user credentials, wherein a processing server is interposed in the path of the document between the user device and the authenticated printing system, said guest print job encompassing any file, whether directly readable by a printer or not, that the guest user desires to print, said method comprising the steps of
   obtaining said guest print job, said guest printing job comprising print job metadata, said first user credentials being associated with said guest print job,
   generating said second user credentials as user credentials that are temporarily authenticatable by said authenticated printing system,
   creating a temporary guest user account in said authenticated printing system, said guest user account being registered in said authenticated printing system in association with said second user credentials,
   converting said guest print job for making it printable by the printer,
   adding said second user credentials to said metadata,
   forwarding at least said print job metadata, comprising said second user credentials to said authenticated printing system for processing, and
   upon expiration of said predetermined amount of time, deleting said guest user account and said second user credentials from said authenticated printing system, wherein the steps of the method are performed by the processing server.

2. The method according to claim 1, said processing by said authenticated printing system comprising one or more of the steps:
   authenticating said guest user using said second user credentials,
   tracking said print job using said second user credentials,
   accounting said guest pint job, using said second user credentials, to an account associated with said guest user, or
   forwarding said guest print job to a printer for printing.

3. The method according to claim 1, further comprising the step of
   rendering said guest print job.

4. The method according to claim 1, said obtaining of said second user credentials being based on transforming said first user credentials, such as truncating said first user credentials.

5. The method according to claim 1, said second user credentials being generated from credentials obtained from said guest user.

6. The method according to claim 5, said first user credentials comprising an email address associated with said guest user, wherein said second user credentials are generated from credentials that are obtained from said guest user by contacting said guest user using said email address.

7. The method according to claim 1,
said obtaining of said second user credentials further comprising storing said second user credentials in a user credentials mapping database and mapping said second user credentials to said first user credentials in said user credentials mapping database, and,
said adding of said second user credentials to said metadata further comprising retrieving said second user credentials from said user credentials mapping database on the basis of said first user credentials.

8. The method according to claim 1 further comprising the steps of
holding said guest print job in a holding queue pending receipt of a release code such as said second user credentials,
providing said release code to said guest user, and
receiving said release code from said guest user and releasing said guest print job from said holding queue.

9. The method according to claim 8, said first user credentials comprising an email address associated with said guest user and said release code being provided to said guest user by sending an email to said email address.

10. The method according to claim 1, said authenticated printing system being provided on a first network, such a network associated with a corporate organization or higher education institution.

11. A system for performing the method according to claim 1, comprising
a processing server for handling a guest print job submitted by a guest user by means of a user device, said guest print job encompassing any file, whether directly readable by a printer or not, that the guest user desires to print, the processing server being connectable to an authenticated printing system in order to be interposed in the path of the document between the user device and the authenticated printing system, said authenticated printing system comprising a program routine for creating a guest user account with said authenticated printing system, said processing server comprising:
a print job obtaining program routine for obtaining said guest print job, said guest print job comprising print job metadata, said first user credentials being associated with said guest print job,
a guest management program routine for generating said second user credentials and for creating a guest user account with said authenticated printing system using said program routine for creating a guest user account, said guest user account being associated with said second user credentials,
a conversion program routine for converting said guest print job for making it printable by a printer, and
a metadata modification program routine for adding said second user credentials to said metadata,
said processing server further being configured to forward at least said print job metadata comprising said second user credentials, to said authenticated printing system for said processing.

12. The system according to claim 11, said authenticated printing system comprising one or more of:
an authentication server for authenticating said guest user using said second user credentials,
a print job tracking server for tracking said guest print job using said second user credentials, or
an accounting server for accounting said guest print job, using said second user credentials, to said guest user account, and possibly also
a print server for forwarding said print job to a printer for printing.

13. The system according to claim 11, said processing server further comprising
a rendering program routine for rendering said guest print job.

14. The system according to claim 11,
said processing server further comprising
a user credentials mapping database for providing said second user credentials based on said first user credentials,
said guest management program routine further being adapted to supply said first user credentials and said second user credentials to said user credentials mapping database for storing said first user credentials and said second user credentials in said user credentials mapping database, and
said metadata modification program routine being adapted to retrieve said second user credentials from said user credentials mapping database using said first user credentials.

15. The system according to claim 11,
said processing server, or said authenticated printing system further being configured for
holding said guest print job in a holding queue pending receipt of a release code,
providing said release code to said guest user, and
receiving said release code from said guest user and releasing said guest print job from said holding queue.

16. The system according to claim 15, said release code comprising said second user credentials and said guest management program routine being configured for providing said second user credentials to said guest user.

17. The system according to claim 14,
said processing server further comprising:
an authentication program routine for authenticating said guest print job, using said first user credentials, against an authentication server for determining if said guest user account exists,
said processing server further being configured for activating said guest management program routine if said guest user account does not exist.

18. A computer program, stored on a non-transitory computer readable medium, which when executed on a computer causes said computer to perform the steps of the method according to claim 1.

* * * * *